(12) United States Patent
Reichhart

(10) Patent No.: US 8,392,279 B2
(45) Date of Patent: Mar. 5, 2013

(54) ORDERING SYSTEM FOR PRINTED PRODUCTS AND METHOD FOR ORDERING A PRINTED PRODUCT

(75) Inventor: Thomas Reichhart, Aldenhoven (DE)

(73) Assignee: Hewlett-Packard Gesellschaft m.b.H., Vienna (AT)

( * ) Notice: Subject to any disclaimer, the term of this patent is extended or adjusted under 35 U.S.C. 154(b) by 585 days.

(21) Appl. No.: 12/589,215

(22) Filed: Oct. 20, 2009

(65) Prior Publication Data

US 2010/0042512 A1 Feb. 18, 2010
US 2012/0203655 A9 Aug. 9, 2012

Related U.S. Application Data

(63) Continuation of application No. PCT/EP2008/003134, filed on Apr. 18, 2008.

(30) Foreign Application Priority Data

Apr. 20, 2007 (DE) .......................... 10 2007 019 174

(51) Int. Cl.
*G06Q 30/00* (2006.01)
(52) U.S. Cl. ...................................................... 705/26.5
(58) Field of Classification Search ................ 705/26.1, 705/26.5
See application file for complete search history.

(56) References Cited

U.S. PATENT DOCUMENTS

| | | | | |
|---|---|---|---|---|
| 6,167,383 A * | 12/2000 | Henson | ....................... | 705/26.5 |
| 6,535,294 B1 * | 3/2003 | Arledge et al. | ............. | 358/1.15 |
| 6,810,401 B1 * | 10/2004 | Thompson et al. | ................... | 1/1 |
| 6,845,365 B2 * | 1/2005 | von Rosen et al. | .......... | 705/26.5 |
| 6,941,276 B2 * | 9/2005 | Haeberli | ........................ | 705/26.5 |
| 7,039,602 B1 * | 5/2006 | Kapadia et al. | .............. | 705/7.29 |
| 7,062,451 B1 * | 6/2006 | Dentel et al. | ................... | 705/26.7 |
| 7,103,581 B1 * | 9/2006 | Suen et al. | .................... | 705/400 |
| 7,330,828 B2 * | 2/2008 | Schoder et al. | .............. | 705/7.29 |
| 7,461,049 B2 * | 12/2008 | Thompson et al. | ................... | 1/1 |
| 7,505,921 B1 * | 3/2009 | Lukas et al. | .................. | 705/26.5 |
| 7,587,336 B1 * | 9/2009 | Wallgren et al. | ............. | 705/26.1 |
| 8,095,431 B1 * | 1/2012 | Ahluwalia | ................... | 705/26.5 |
| 2002/0078130 A1 * | 6/2002 | Thornton et al. | ............. | 709/201 |
| 2003/0046179 A1 * | 3/2003 | Anabtawi et al. | ............... | 705/26 |
| 2004/0111326 A1 | 6/2004 | Rock et al. | | |
| 2004/0122691 A1 | 6/2004 | Lupp et al. | | |
| 2007/0177191 A1 * | 8/2007 | Eschbach et al. | ............ | 358/1.15 |
| 2008/0180729 A1 * | 7/2008 | LaVigne et al. | ............. | 358/1.15 |
| 2008/0208711 A1 * | 8/2008 | Mirmotahari et al. | .......... | 705/27 |
| 2010/0277758 A1 * | 11/2010 | Reichhart | .................... | 358/1.15 |

OTHER PUBLICATIONS

Anon, "Hiflex Software Gesmbh; "Ordering System for Printed Products and Method for Ordering a Printed Product" in Patent Application Approval Process", Marketing Weekly News, dated Sep. 1, 2012.*
Gibson, Karen, "Easily tailor the contents of merged documents based on variable data", Inside Corel WordPerfect Suite 11. 1 (Jan. 2005): 1-4.*
DE Non-Patent Literature, 2002, E-Commerce und E-Business Marktmodelle, Anwendungen und Technologien by Dr. Michael Merz; copyright 2002 dpunkt.verlag GmbH, 14 pages.

* cited by examiner

*Primary Examiner* — Mark Fadok

(57) ABSTRACT

The invention relates to an ordering system for printed products, by means of which a printed product can be defined in a selection module of the ordering system and ordered from a supplier for the printed products, wherein printed products of the same product type are made of product components of the same product component types, and wherein each product component is defined precisely by a combination of a value for parameters such as page format, number of pages, coloration, type of paper, type of binding, processing, and finishing. The invention further relates to a method for ordering a printed product by means of an ordering system, wherein the ordering system determines a list of selectable values for the parameter such as page format, number of pages, coloration, type of paper, type of binding, processing, and finishing of a product component of the printed product, and wherein the ordering system orders the printed product based on the defined values after a value has been defined for each of the parameters by a buyer. In order to simplify the data management of the ordering system for printed products, it is proposed that each individual possible value for each of the parameters is defined as an article in an article database of the ordering system, and that the printed product can be defined in the selection module by successive selection from the articles, and that the ordering system determines the selectable values for the product component from an article database in which each possible value of each of the parameters is defined as an article.

8 Claims, No Drawings

ORDERING SYSTEM FOR PRINTED PRODUCTS AND METHOD FOR ORDERING A PRINTED PRODUCT

RELATED APPLICATIONS

This application is a continuation of International patent application serial No. PCT/EP2008/003134, filed on Apr. 18, 2008 claiming priority from German patent application serial No. DE 10 2007 019 174.1, filed on Apr. 20, 2007, both of which are incorporated in their entirety by this reference.

BACKGROUND

1. Field of the Invention

The invention relates to an ordering system for printed products, by means of which a printed product can be defined in a selection module of the ordering system and ordered from a supplier of the printed products, wherein printed products of the same product type are made of respective product components of the same product component types, and wherein each product component is defined by exactly one respective combination of a value for parameters such as page format, number of pages, coloration, type of paper, type of binding, processing, and finishing. The invention relates further to a method for ordering a printed product by means of an ordering system, wherein the ordering system determines a list of selectable values for respective parameters such as page format, number of pages, coloration, type of paper, type of binding, processing, and finishing of a product component of the printed product, and wherein the ordering system orders the printed product based on the defined values after a respective value has been defined for each of the parameters by a buyer.

Ordering systems, which in particular implement methods of the recited type, are generally known and are being increasingly used as a front end for orders by buyers of printed products. Large graphic production shops as suppliers for individual printed products advertise that they offer a buyer several hundreds of thousands of various printed products for selection through their respective ordering system and an online determination of the final price.

Each printed product is comprised of one or multiple product components. Each product component comprises respective predetermined values for parameters such as page format, page number, coloration, paper type, binding type, processing and finishing. The product components are typically categorized by product component types with descriptive designations such as "cover", "content", "postcard", and "poster".

The known ordering systems resort to using database structures for managing the printed products offered by one respective supplier. These database structures issue an article number for each particular printed product in a dataset and list the specific values of the parameters for each particular product component where necessary, and a price calculated there from based on a respective formula. For example, when the technical capabilities of the graphics production shop change or when the calculation for a parameter changes, each particular dataset in said data structure needs to be maintained.

In particular, in large graphics production shops with a plurality of different machines and accordingly a plurality of various options for graphics production, maintaining data for the known ordering systems is so complex that complete automation of orders through the ordering systems eventually becomes uneconomical. In order to reduce the complexity of data maintenance, the known ordering systems are often used to capture only portions of the selections actually available and they state furthermore that additional options will be available upon request.

2. Object of the Invention

Thus, it is the object of the invention to simplify data management for an ordering system for printed products.

BRIEF SUMMARY OF THE INVENTION

It is proposed according to the invention that each particular possible value for each of said parameters is defined as an article in the article database of the ordering system, and that a printed product can be defined in the selection module through successive selection of the articles.

Thus, in an ordering system according to the invention, the printed product selected for ordering is defined through the selection of its values only when the order is placed. An article database, in which the respective values for the parameters and the price are listed in the sense of the known ordering systems for each printed product as an "article", is thus redundant. Thus, the data volume, which has to be managed is reduced by several orders of magnitude compared to known ordering systems.

Capturing the technical capabilities of a printing shop in eight parameters with five numerically specified values each would already numerically correspond in one of the known ordering systems to several hundreds of thousands of theoretically possible printed products, which would need to be captured in the database as separate articles. In an ordering system according to the invention, only forty values are stored as articles instead.

Preferably, at least one cost factor is stored for each parameter in the article database of an ordering system according to the invention, and a price for the printed product can be determined by means of a calculation module of the ordering system for the printed product based on the values and cost factors of the parameters of the printed product. A cost factor is a factor which influences the cost of the printed product in combination with other cost factors. For example, a cost factor of the parameter "page number" corresponds to the number of pages. A cost factor of the parameter "page format" corresponds to the surface area of the format, and a cost factor of the parameter "paper" corresponds to its surface area related cost portion. The cost portion of the paper in the price of the printed product can thus be defined as a multiplication of said cost factors. The ordering system according to the invention then also provides the option for a buyer of a printed product to determine its price without having to manage said price for each printed product as it is required in the known ordering systems.

Furthermore, a list of the associated product component types is preferably stored in the article database for each product type, and a product type for the printed product is initially selectable in the selection module for defining the printed product. Selecting a printed product type facilitates a very ostensive coarse restriction of the values for the parameters which are selectable in due course for defining the printed product and facilitates operating the ordering system according to the invention for the buyer. Alternatively, also ordering a printed product whose type is not defined in advance is conceivable by defining one or multiple product types, whose type is not defined either, by selecting respective values for all technically feasible parameters, which values are not restricted in advance.

Last but not least, a list of impossible pairings of articles is advantageously stored in the article database of an ordering system according to the invention, and the selection of additional selectable articles is restricted based on said list in the selection module after an article is selected. Impossible pairings of values of different parameters (e.g. a cross fold for a postcard made of a heavy carton in the format DIN A6) can be excluded in this list; and further, impossible pairings of values of the parameters of different product components can be excluded, e.g. a rolled poster as an insert for a magazine.

DETAILED DESCRIPTION OF THE INVENTION

Based on the known method, it is suggested according to the invention, that the ordering system determines the values, which can be selected for the product component, from an article database in which each particular possible value for each of the parameters is defined as an article. Preferably, the ordering system selects a product component type of the product component based on a list of product component types associated with the product type, and selects the parameters which need to be determined for the product component based on the product component type, after the product type of the printed product is defined by the buyer. In another preferred embodiment, the ordering system restricts the lists of selectable values based on a list of impossible pairings of the articles. The methods according to the invention, in particular according to the preferred embodiments, can be implemented by means of the ordering systems according to the invention, and comprise the advantages listed for said ordering systems.

Preferred Embodiment

The invention will now be described with reference to a preferred embodiment.

A large printing business provides its selection of over 250,000 different individual printed products in an ordering system, which is freely accessible through the internet for all buyers of printed products. The technical capabilities of the large printing company include offset and digital printing in formats of 85×54 mm for business cards up to large format prints of 100×220 cm on approximately twenty different paper types with lamination, lacquering or glue coating or as a multipart form set, wire- or thread stitched, ring- or glued bound, in Leporello- or roll fold, or rolled up in standard- or express production and/or delivery.

In the ordering system according to the invention, the buyer initially selects one product type out of a clearly structured selection of only eleven standardized product types at his PC-workstation through the selection module opened in a standard browser. This may be the product type respectively comprised of a single sheet, "postcard", "label", "business card", "folded flyer" and "unfolded flyer", "stationery", "poster" and "XXL-poster", and the product type comprised of multiple product components, "writing pad", "multipart form set", "folder", "glue bound brochure", "wire stitched brochure" and "ring bound brochure".

Additionally, the ordering system supports the selection from a keyword list or it supports a free text entry of a product type. For example, when entering the product type "ID", the standardized product type "business card" with a restriction of the paper types to heavy carton and additional lacquering or lamination, and when entering the product type "CD designation", a branch off is automatically performed to the standardized product type "folder", with the product components "cover carton" for the cover, and a loosely inserted "thread stitched brochure" with "folder" and "content" in the special format "CD cover", and optionally with a round punched out "self-adhesive" label as an insert.

For each of the product types, a list of associated product component types is stored in the article database stored in an XML file. For example, a "brochure" is comprised of a product component "folder" and a product component "content", irrespective, of the binding type, and optionally comprised of one or multiple "inserts" stitched in at a defined location or loosely inserted, and comprised of one respective single sheet. Each "insert" can be initialized with specific properties in the selection module by selecting one of the product types comprised of a single sheet or it can be freely defined alternatively.

For each product component type, the particular possible values of the parameters "format", "page number", "coloration", "paper", "bookbinding", and "processing" are defined in the article database as articles. For example, for the product component type "content" of a glue bound brochure, the values "A4" through "A6" respectively portrait and landscape and "DIN long" and "DIN long transversal" are defined for the format and for the page number values of 100 to 120 are defined in steps of 4, for the coloration "1/1" or "4/4", for the paper "80 g offset" or "115 g" or "150 g image print" respectively flat or gloss, for bookbinding the value "cross fold", for processing either no value or "perforate" and no value is defined as an "article" for the finishing. Furthermore, at least one cost factor is defined for each article in the database.

Furthermore, impossible pairings of articles are defined in the article database. This is illustrated in an exemplary excerpt in the following table for the product component "folded flyer", as the only product component of the printed product with the same name:

| | |
|---|---|
| pflyef.A[4-6] | pflyef.(1[0-8])P |
| pflyef.(6\|8\|1[2-8])P | pflyef.paraf |
| pflyef.4P | pflyef.zickf\|combf\|lettf |
| pflyef.[6-8]P | pflyef.combf |

Thus, for a folded flyer ("pflyef"), the formats A4 through A6 in combination with 10-18 pages, page numbers 6, 8 or 12 through 18 in combination with a parallel fold, page number 4 in combination with a zigzag-, combination- or letter fold and page numbers 6-8 in combination with a combination fold are excluded as "impossible pairings" of articles, and therefore also excluded as particular values for parameters.

Frequently used print runs are additionally defined in the article database for each product type. After the printed product is determined, the ordering system determines the respective cost portions for said predefined print runs based on the values and cost factors of the selected articles, and determines the cost of the printed product as a sum there-from, and displays the respective prices to the buyer, sorted according to increasing print runs in the selection module. Furthermore, the buyer can define a freely selected print run in an entry field of the selection module, which print run is then sorted by the ordering system into the list of the print runs illustrated for comparison purposes and displayed to the buyer in the selection module.

After a print run is selected, the ordering system shows a page to the buyer in the selection module, which page includes a brief summary of the selected articles, properties of the selected "printed product" in the view of the buyer with additional options. In particular, different options are offered for proofs, for shipping and for the format of the print data.

After the entry of the identification of the buyer, the ordering system confirms the receipt of the order to the buyer on a separate screen page and via email and transmits the order to the large printing shop.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An ordering system for printed products, comprising:
a selection module to generate a user interface for a computer to allow a user to define a printed product from a selection of articles presented to the user through the computer, wherein a printed product comprises at least one product component, wherein each of the at least one product component is defined by exactly one combination of values for a set of parameters; and
an article database, that includes each of the articles presented to the user, wherein each possible value for each of the parameters is stored as an article in the article database, and each product component is defined by exactly one combination of values for each of the parameters;
wherein the selection module, through the user interface, allows the user to further define the printed product through an additional selection from the selection of articles, and
wherein the article database includes a list of impossible pairings of the articles to restrict the selection of additional articles based on the list after an article is selected.

2. The ordering system according to claim 1, further comprising a pricing module,
wherein at least one cost factor is stored in the article database for each article, and the pricing module is to determine a price of the printed product based on the values and cost factors of the parameters of the printed product.

3. The ordering system according to claim 2,
wherein the printed product comprises a product type and each product component comprises a product component type,
wherein printed products of a same product type include product components of a same product component type,
wherein a list of product component types is stored in the article database for each product type, and
wherein the generated user interface is to allow the user to select the product type for the printed product, and after the selection of the product, to select a product component type for the printed product from a list of product component types associated with the product type.

4. The ordering system according to claim 1,
wherein the user interface is to allow the user to select a product type for the printed product based on the stored list of product types.

5. A method for ordering a printed product by means of an ordering system, comprising:
presenting, on a computer, a list of selectable values for parameters of product components associated with the printed product to a buyer of the printed product using an ordering system, and
after determining one value for each of the parameters through buyer input, ordering the printed product based on the one value for each of the parameters,
wherein the ordering system presents the list of selectable values for the parameters of the product components from an article database, and the article database comprises an article for each particular possible value for each of the parameters, and
wherein the ordering system restricts the list of selectable values based on a list of impossible pairings of the articles stored in the article database.

6. The method according to claim 5,
wherein the printed product comprises a product type and each product component comprises a product component type,
wherein printed products of a same product type include product components of a same product component type, and
wherein the method further comprises:
receiving a selection of the product type for the printed product, and
after receiving the selection of the product type, receiving a selection of a product component type for the printed product from a list of product component types associated with the product type.

7. The ordering system according to claim 1, wherein the parameters include page format, page number, coloration, paper type, binding type, processing and finishing.

8. The method according to claim 5, wherein the parameters include page format, page number, coloration, paper type, binding type, processing and finishing.

* * * * *